US012003010B2

(12) United States Patent
Tiemeijer et al.

(10) Patent No.: US 12,003,010 B2
(45) Date of Patent: Jun. 4, 2024

(54) PLANAR BALUN WITH NON-UNIFORM MICROSTRIP LINE WIDTH TO IMPROVE S-PARAMETER ALIGNMENT

(71) Applicant: NXP B.V., Eindhoven (NL)

(72) Inventors: Lukas Frederik Tiemeijer, Eindhoven (NL); Waqas Hassan Syed, Eindhoven (NL); Ralf Maria Theodoor Pijper, Maastricht (NL); Harish Nandagopal, Veldhoven (NL)

(73) Assignee: NXP B.V., Eindhoven (NL)

( * ) Notice: Subject to any disclaimer, the term of this patent is extended or adjusted under 35 U.S.C. 154(b) by 225 days.

(21) Appl. No.: 17/558,934

(22) Filed: Dec. 22, 2021

(65) Prior Publication Data

US 2023/0198114 A1 Jun. 22, 2023

(51) Int. Cl.

| | |
|---|---|
| ***H01P 1/203*** | (2006.01) |
| ***H01P 1/20*** | (2006.01) |
| ***H01Q 13/20*** | (2006.01) |
| *H01P 5/10* | (2006.01) |

(52) U.S. Cl.

CPC ...... *H01P 1/20372* (2013.01); *H01P 1/20381* (2013.01); *H01Q 13/206* (2013.01); *H01P 5/10* (2013.01)

(58) Field of Classification Search

CPC ......... H01P 1/20372; H01P 1/203; H01P 1/20
USPC .................................................. 333/204–207
See application file for complete search history.

(56) References Cited

U.S. PATENT DOCUMENTS 9,795,027 B2 * 10/2017 Watanabe ............ H05K 1/0225
2003/0102937 A1 6/2003 Hiroshima et al.
2021/0249747 A1 * 8/2021 Zang ....................... H01P 3/081

OTHER PUBLICATIONS

U.S. Appl. No. 17/226,376, filed Apr. 9, 2021, Waqas Hassan Syed.
Hancock, C., "Transformers from coax", Electronics World, Jan. 2000.
Zhang, W., "Compact coupled-line balun with complex impedances transformation and high isolation", IET Microwaves, Antennas & Propagation, vol. 9, Iss. 14, pp. 1587-1594, Jun. 23, 2015.

(Continued)

*Primary Examiner* — Rakesh B Patel

(57) ABSTRACT

A compact planar balun formed on a substrate including a hairpin-shaped conductive microstrip and a single-ended contact. The hairpin-shaped conductive microstrip includes first and second linear segments integrally formed with a U-shaped segment, and a single-ended contact is conductively coupled at a location along the first linear segment. The first and second linear segments each have a first characteristic impedance and are in parallel with each other having a first end forming first and second differential contacts and having a second end. The U-shaped segment has a second characteristic impedance that is less than the first characteristic impedance in order to achieve proper scatter parameter alignment. The U-shaped segment may be generally formed thicker or wider than the linear segments to achieve a reduced characteristic impedance. In the alternative or in addition, co-planer ground metal is formed closer to the U-shaped segment to achieve a reduced characteristic impedance.

20 Claims, 9 Drawing Sheets

(56) References Cited

OTHER PUBLICATIONS

Zhang, W., "Planar Compact Dual-Band Coupled-Line Balun with High Isolation", Energy-Efficient Microwave Components for Mobile Communication, Feb. 2017.
Si, Ming-Li et al. "A Simple Microstrip-to-CPS Transition Using Elliptical Transmission Line as an Ultra-Broadband Balun." ©2008 IEEE. Authorized licensed use limited to : NXP Semiconductors. Downloaded on Jul. 24, 2020 from IEEE Xplore. pp. 1-4.
Qian, Yongxi et al. "A Broadband Uniplanar Microstrip-to-CPS Transition." 1997 Asia Pacific Microwave Conference. 4A16-8. Authorized licensed use limited to: NXP Semiconductors. Downloaded on Jul. 21, 2020 from IEEE Xplore. pp. 609-612.

* cited by examiner

PLANAR BALUN WITH NON-UNIFORM MICROSTRIP LINE WIDTH TO IMPROVE S-PARAMETER ALIGNMENT

BACKGROUND

Field of the Invention

The present disclosure relates in general to planar baluns provided on packaged integrated circuit devices, and more specifically to a U-shaped planar balun with non-uniform characteristic impedance to improve S-parameter alignment.

Description of the Related Art

High performance millimeter-wave interfaces are used to maximize the performance of monolithic microwave integrated circuits (MMICs). A cost-effective and performance-driven packaging technique to connect MMICs input output (IO) signals to a printed circuit board (PCB) can be realized by using a ball-grid-array-based (BGA) package structure. Examples of these packages are embedded wafer level ball grid array (eWLB), flip-chip chip-scale package (FCCSP), flip-chip ball-grid array (FCBGA), and panel level package (PLP).

A galvanic connection from a MIMIC silicon die to a PCB board is typically used, which includes two intermediate transitions. The first transition is a die-to-package transition, which connects the die to the package substrate laminates, or the die to a metallization layer on top of a dielectric layer of the package substrate. A differential implementation of the silicon circuitry is often used, as this decreases the sensitivity of the active circuitry to external common-mode signals present, for example, on the PCB lines or traces on a package laminate. As a consequence of the differential circuit implementation, the transition from die to package is differential as well.

The second transition is a package-to-PCB interface, which connects the package to the PCB using the solder-ball ball-grid array. This interface can be designed to be either differential or single-ended. A differential implementation uses two signal lines, which can occupy space on the PCB and may cause routing constraints for the power, ground and other digital connections on the PCB. Consequently, single-ended connections are often used on the PCB, for example, to feed single-ended antennas. Another reason is that routing using a single-ended transmission line may be easier to accomplish than balanced differential transmission lines.

In some millimeter (mm) wave packages used for automotive RADAR, all mm-wave interfaces are differential at the die-to-package and at the package-to-PCB interface. This means that an additional circuit component to convert from balanced-to-single ended (unbalanced) signals should be added on the PCB. This circuit component is generally called a “balun” and is used to measure performance using equipment with probes, or to connect to the standard microstrip based antenna to radiate power in free space.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

Figure 1:
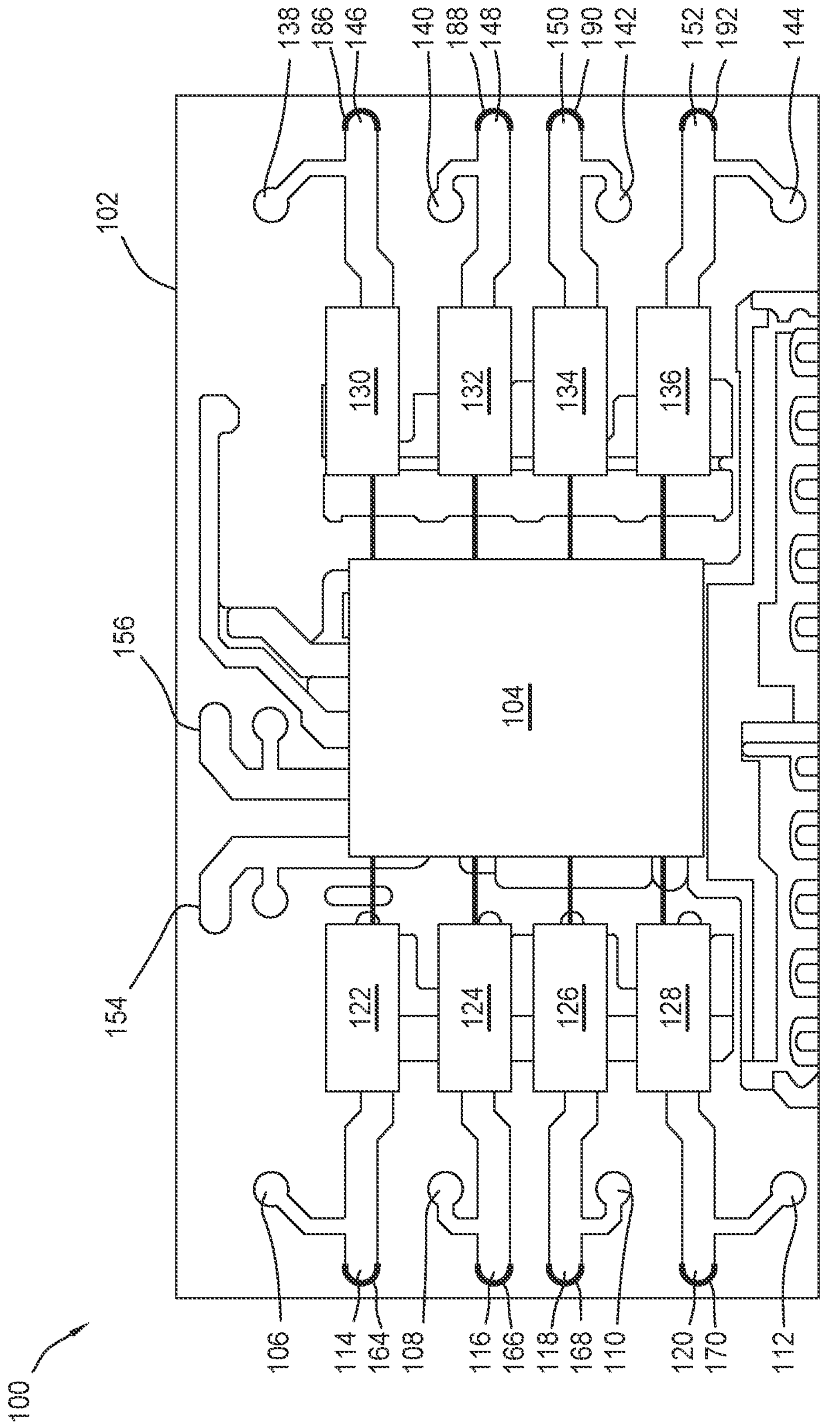
FIG. 1 illustrates a top view diagram of components of an integrated circuit device in accordance with selected embodiments of the present disclosure.

Embodiments disclosed herein provide a packaged mm-wave integrated circuit (IC) device with a built-in balun component that reduces area that would otherwise be required by the balun on a printed circuit board (PCB). A single-ended package to PCB interface is also provided. The packaged IC device uses a differential die-to-package interface to mitigate common mode signals on the PCB or package laminate being coupled to the die. Integrated shielding for the balun is obtained using a multi-layer laminate package substrate to suppress the crosstalk between channels. In addition, shielded coaxial transition is integrated in the package to PCB interface to lower radiation losses and suppress crosstalk between channels for core and coreless flip chip chip scale package (FCCSP) formats. Embodiments of the IC device can use any ball grid array package technology that includes two or more metal redistribution layers inside the package.

The built-in balun component reduced area that would otherwise be required by the balun on a PCB or the like. The balun shown and described herein is implemented at the package level, but may be extended to different levels, such as die or PCB or the like with different lossy and cost considerations. The balun was configured as a hairpin-shaped conductive microstrip with uniform width that converted between single-ended (SE) and differential (DIF) signals. A conductive microstrip line or linear segment is a metal formation with a thickness generally smaller than its width running over a metal ground plane at a height which is similar to the microstrip line width. For a given height, the width sets the characteristic impedance Z0 of the line, which is calculated from the ratio between the line inductance and line capacitance to the ground plane of the transmission line. In order to achieve a compact layout that can be integrated into an IC package, the balun was squeezed into a hairpin-shaped formation with elongated sides or legs integrally formed with a U-shaped segment (at the bend of the hairpin-shaped formation). At the intended operating frequency, such as, for example, 78 gigahertz (GHz), the electrical length of the path from an SE pin to a first pin at one end of the hairpin-shaped balun is a half wavelength longer than the electrical length from the SE pin to a second pin at the other end of the balun. As a result, the signals arriving at the respective pins are intended to have a desired 180-degree (°) phase difference with approximately equal amplitude.

Due to the close proximity of the microstrip transmission line sections forming the elongated legs of the balun, however, inductive and capacitive coupling occurred between the legs of the balun. When the current in the transmission line sections flowed in opposite directions, the inductive coupling reduced the effective inductance and the capacitive coupling increased the effective capacitance. Although the three transmission line propagation delays and losses were largely unaffected, and although the characteristic impedance Z0 of the transmission line section at the U-shaped segment between the balun leg segments remain unmodified, the effective characteristic impedances Z0 were reduced in the elongated leg segments. As a result, the scatter parameter (S-parameter) alignment was modified and was mis-aligned.

In order to achieve proper balun S-parameter alignment, the characteristic impedance Z0 of the transmission line at the U-shaped segment of the balun is adjusted. As further described herein, the width of the vertical microstrip transmission line of the U-shaped segment (or bend of the hairpin-shaped formation) may be increased to reduce its characteristic impedance Z0 until the S-parameter alignment is restored. In particular, the hairpin-shaped balun layout is modified with a width variation at the U-shaped segment to achieve the desired S-parameter alignment. Alternatively, or in addition, the spacing between the balun and the co-planar ground metal may be narrowed to reduce the characteristic impedance of the U-shaped segment to achieve the desired S-parameter alignment.

FIG. 1 is a top view diagram of components that can be included in integrated circuit (IC) device 100 in accordance with an embodiment of the present disclosure. In the example shown, IC device 100 includes chip substrate 102, processing die 104, signal vias 106, 108, 110, and 112 (106-112) and 138, 140, 142, and 144 (138-144), baluns 114, 116, 118, and 120 (114-120) and 146, 148, 150, and 152 (146-152), receiver circuitry 122, 124, 126, and 128 (122-128), and transmitter circuitry 130, 132, 134, and 136 (130-136). In some contexts, packaged IC device 100 may be referred to as a millimeter wave integrated circuit (MMIC) chip with die 104 being an MMIC die. Receiver circuitry 122-128 and transmitter circuitry 130-136 can alternatively be embedded within processing die 104.

Chip substrate 102, also referred to as a laminate substrate, can include one or more metal layers embedded in or formed on or between dielectric layers. Chip substrate 102 connects processing die 104, receiver circuitry 122-128, and transmitter circuitry 130-136 to a PCB (e.g., PCB 206, FIG. 2) through a conductive network of traces and holes filled with conductive material, also referred to as vias. Chip substrate 102 supports functions including circuit support and protection, heat dissipation, and signal and power distribution. When using a flip chip chip scale package (FCCSP) format, IC device 100 is connected to a PCB through a matrix of solder balls or copper pillars rather than wire bonding. Other suitable substrate formats, however, can be utilized.

Processing die 104 can include one or more processing cores, volatile and non-volatile memory devices, connectivity circuitry, network interfaces, software programs stored on one or more memory devices and executable by the processing cores, analog-to-digital converters, digital to analog converters, a temperature sensor, power management circuitry, safety and security circuitry and components, as well as other suitable circuitry and components. Processing die 104 can be coupled to communicate with network transceivers (not shown), power management circuitry (not shown), functional safety circuitry (not shown), receiver circuitry 122-128, and transmitter circuitry 130-136, as well as other suitable circuitry and components.

Signal vias 106-112 and 138-144 can be included in one or more layers of chip substrate 102 to form an electrical connection between an antenna (e.g., 508, FIG. 5) and processor die 104. Signal vias 106-112 and 138-144 can be fabricated by forming an opening in one or more dielectric layers of substrate 102 and filling the opening with a conductive material. Signal vias 106-112 and 138-144 can be enclosed or protected by an antipad (not shown), where an antipad provides clearance between the opening of signal vias 106-112, 138-144 and a ground metal layer. An antipad is an opening in a ground metal layer with sufficient clearance for signal vias such that a desired signal characteristic impedance set forth by the ratio of signal via inductance and antipad capacitance may be obtained. A trace (not shown) from signal vias 106-112 and 138-144 to the antenna may be formed to allow signals to be transmitted or received between the antenna to processor die 104.

Signal vias 106-112 for receiver circuitry 122-128 are connected to respective baluns 114-120 and signal vias 138-144 for transmitter circuitry 130-136 are connected to respective baluns 146-152. Receiver circuitries 122-128 are connected to respective baluns 114-120. Transmitter circuitries 130-136 are connected to respective baluns 146-152. In some embodiments, conductive traces between signal vias 106-112 and 138-114 are single-ended conductive lines that are coupled to single ended antenna, with one antenna coupled to a respective one of signal vias 106-112, 138-144. Accordingly, IC device 100 can communicate differential signals between processor die 104 and baluns 114-120, 146-152, and single-ended signals between baluns 114-120, 146-152 and respective receive and transmit antenna. It is noted that in other embodiments, the baluns 114-120 can be configured with a single ended connection at processor die 104 and double-ended or differential connections to signal vias 106-112 and 138-114 that are configured to provide respective differential connections to double ended antenna. This means there would be two signal vias per antenna instead of one signal via per antenna.

Each of signal vias 106-112, 138-114 and corresponding baluns 114-120, 146-152 are part of a single communication channel. In some embodiments, the communication channels may use frequency modulated continuous wave (FMCW) devices that operate in a frequency range of 76 to 81 GHz when used for automotive RADAR applications. The channels may be tuned to operate with other scanning technology and frequencies, however, such as with frequencies associated with emerging mmWave 5G systems, for example. It is appreciated that the balun structures described herein, including the widened U-shaped segment, may be easily modified in size and extended to technologies operating at other frequencies, such as, for example, 6G communications operating at 100 GHz, or next generation radar frequency operating at 140 GHz, or other technologies or frequencies currently known or to be developed.

In addition to baluns 114-120, 146-152, baluns 154, 156 can be included in IC device 100 for use with mm-Wave clock signals which are used to synchronize multiple radar or communication transceivers. An example is synchronizing radar transceivers by sharing a local oscillator mm-Wave signal which is generated by an initiator transmitter (not shown) as a differential signal, distributed on the PCB as a single ended signal and received by a responder receiver (not shown) as a differential signal. Balun 154 can therefore be coupled to the responder receiver with a differential signal and balun 156 can be coupled to the initiator transmitter with a single ended signal.

Baluns 114-120 and 146-152 can be fabricated using conductive material in a first metal layer of chip substrate 102 to transform an unbalanced signal to a balanced signal, or vice versa. Baluns 114-120 and 146-152 are formed as an elongated planar loop with one end of the loop connected to a first signal of a differential pair of signals used by respective receiver circuitry 122-128 or transmitter circuitry 130-136, and another end of the loop connected to a second signal of the differential pair of signals used by respective receiver circuitry 122-128 or transmitter circuitry 130-136. At some point along the loop of each of baluns 114-120, 146-152, a single-ended conductive trace is formed to connect each of baluns 114-120, 146-152 to a corresponding one of signal vias 106-112, 138-144.

In RADAR systems, receiver circuitry 122-128 receives signals that echo from an object illuminated by signals transmitted from transmitter circuitry 130-136. When IC device 100 is used for other purposes, the transmit and receive signals can be independent of one another. FIG. 1 shows four channels or chains of receiver circuitry 122-128, however any suitable number of receive channels can be included. Each receive channel can include programmable high-pass filters to suppress strong low frequency signals, as well as low-pass filters to suppress signals in an analog-to-digital converter aliasing band. Each receive channel can also include a programmable decimation filter with a number of decimation factors. Data from the decimation filter can be output on high-speed low-voltage differential signaling, in raw ADC serial data streaming, or in packetized format with added cyclic redundancy check information. A full-duplex Serial Peripheral Interface (SPI) can be included for bidirectional exchange of control and monitoring data between receiver circuitry 122-128 and other components in IC device 100. When used for applications other than RADAR, receiver circuitry 122-128 can include other components in addition to or instead of components required for RADAR applications.

FIG. 1 further shows four channels or chains of transmitter circuitry 130-136, however any suitable number of transmitter channels can be included. Each transmitter channel can include a waveform generator offering flexible chirp control with a chirp bandwidth up to 5 GHz or other suitable frequency. When used for RADAR applications, transmitter circuitry 130-136 can also include binary phase control and output level stabilization, and a timing engine that supports different multiple input-multiple output RADAR operation modes by programming of digital registers controlling timing parameters and front end configuration on a chirp-to-chirp basis. The phase of the transmit signals can be controlled on a chirp-to-chirp basis by a timing engine, or by digital I/O signals directly connected to binary phase shifters of different transmit sections. When used for applications other than RADAR, transmitter circuitry 130-136 can include other components in addition to or instead of components required for RADAR applications.

It is noted that receiver circuitry 122-128 and transmitter circuitry 130-136 may be configured for uses other than RADAR, such as cell phone or wireless network communications.

Each of the baluns 114-120 and 146-152 generally has a hairpin shape including a pair of generally straight elongated legs or leg segments integrally formed with a U-shaped segment at the hairpin bend. The purpose of each compact planar balun is to split a received antenna signal with a target frequency (e.g., 78 GHz) and received from signal vias 106-112 into two equal parts having a 180-degree phase difference before they enter the receiver circuitry 122-128 of the IC device 100, or to combine two signals transmitted by the transmitter circuitry 130-136 of IC device 100 having a 180-degree phase difference into a single antenna signal provided to signal vias 138-152. It is noted that the balun structure as described herein is not restricted to the particular example chosen, but generally applies for other Radio Frequency (RF) signals as well which could be anywhere between a few megahertz (MHz) and a few terahertz (THz). Furthermore, balun structures described herein could be used for improving similar compact hairpin shaped planar baluns realized in the back-end metal layers of common IC processes as well as on PCBs and the like. Frequency ranges where similar compact hairpin shaped planar baluns have practical and manufacturable dimensions may differ. In general, similar balun structures may be implemented at any level, such as on die, package, PCB, etc. On PCBs, lower frequencies are feasible than in a package (e.g., on the chip substrate 102), and on an IC (e.g., integrated on or within the processing die 104) higher frequencies are feasible than in a package. It is appreciated that implementation at different levels may have different lossy levels and variable cost considerations.

In an original configuration, the width of the microstrip forming the hairpin-shaped baluns 114-120 and 146-152 was uniform throughout its length including the hairpin leg segments and the U-shaped segment. Due to the close proximity of the microstrip transmission line sections forming the elongated legs of each balun, however, inductive and capacitive coupling occurred between the leg segments of the balun. When the current in the leg segments flowed in opposite directions, the inductive coupling reduced the effective inductance and the capacitive coupling increased the effective capacitance. As a result, the effective characteristic impedances Z0 were reduced in the elongated leg segments, and the scatter parameter (S-parameter) alignment was modified and was mis-aligned for both receive and transmit operations.

As further described herein, however, each of the baluns 114-120 and 146-152 includes widened U-shaped segments 164, 166, 168 and 170 (164-170) and 186, 188, 190, and 192 (186-192), respectively, in which the microstrip is widened at the respective U-shaped segments relative to the corresponding parallel leg segments of the hairpin-shaped formation to reduce the corresponding characteristic impedance in order to restore the S-parameter alignment of each of the baluns.

Figure 2:
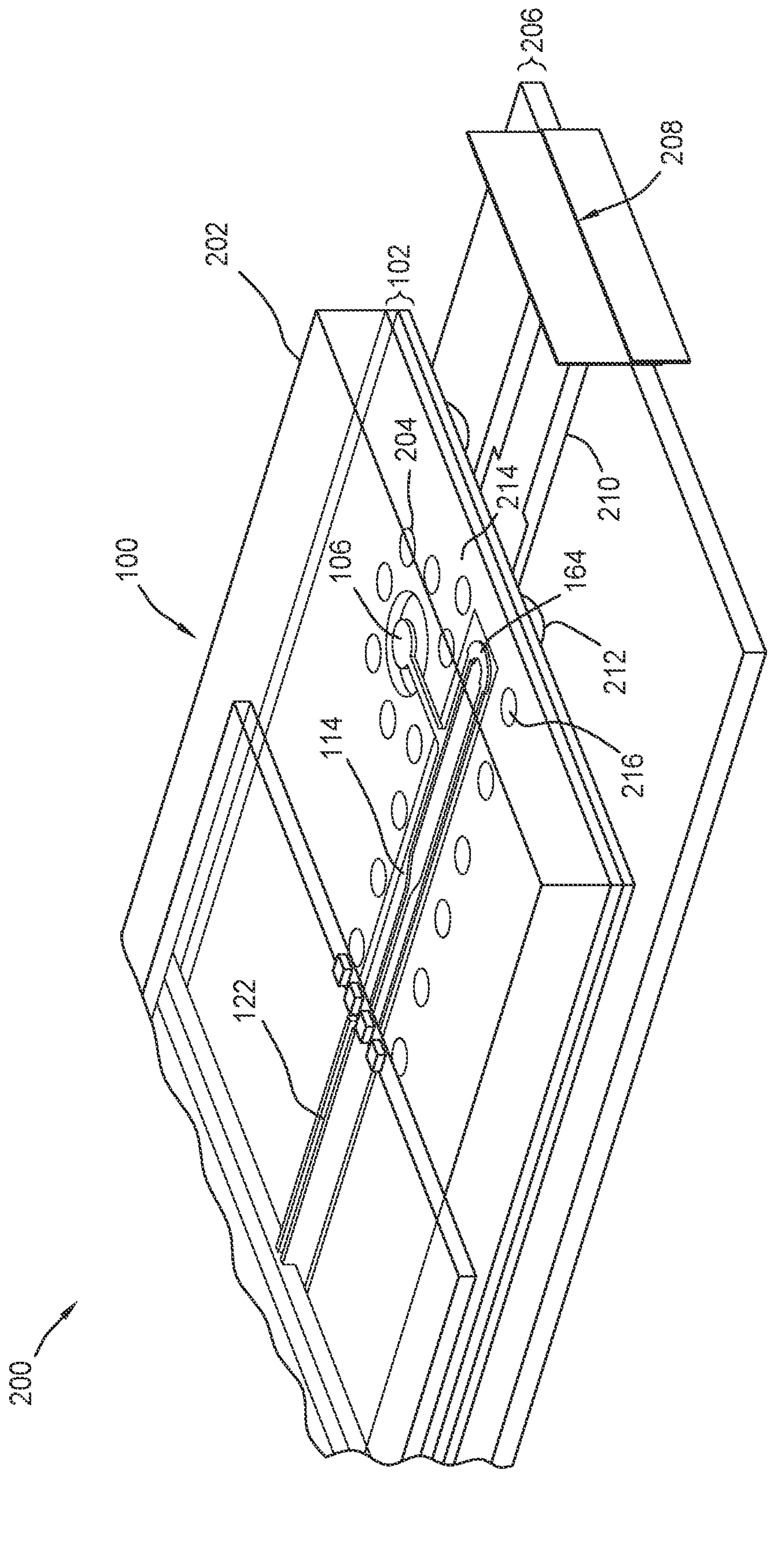
FIG. 2 illustrates a perspective view diagram of a portion of the integrated circuit device of FIG. 1 mounted on a printed circuit board in accordance with selected embodiments of the present disclosure.
Figure 3:
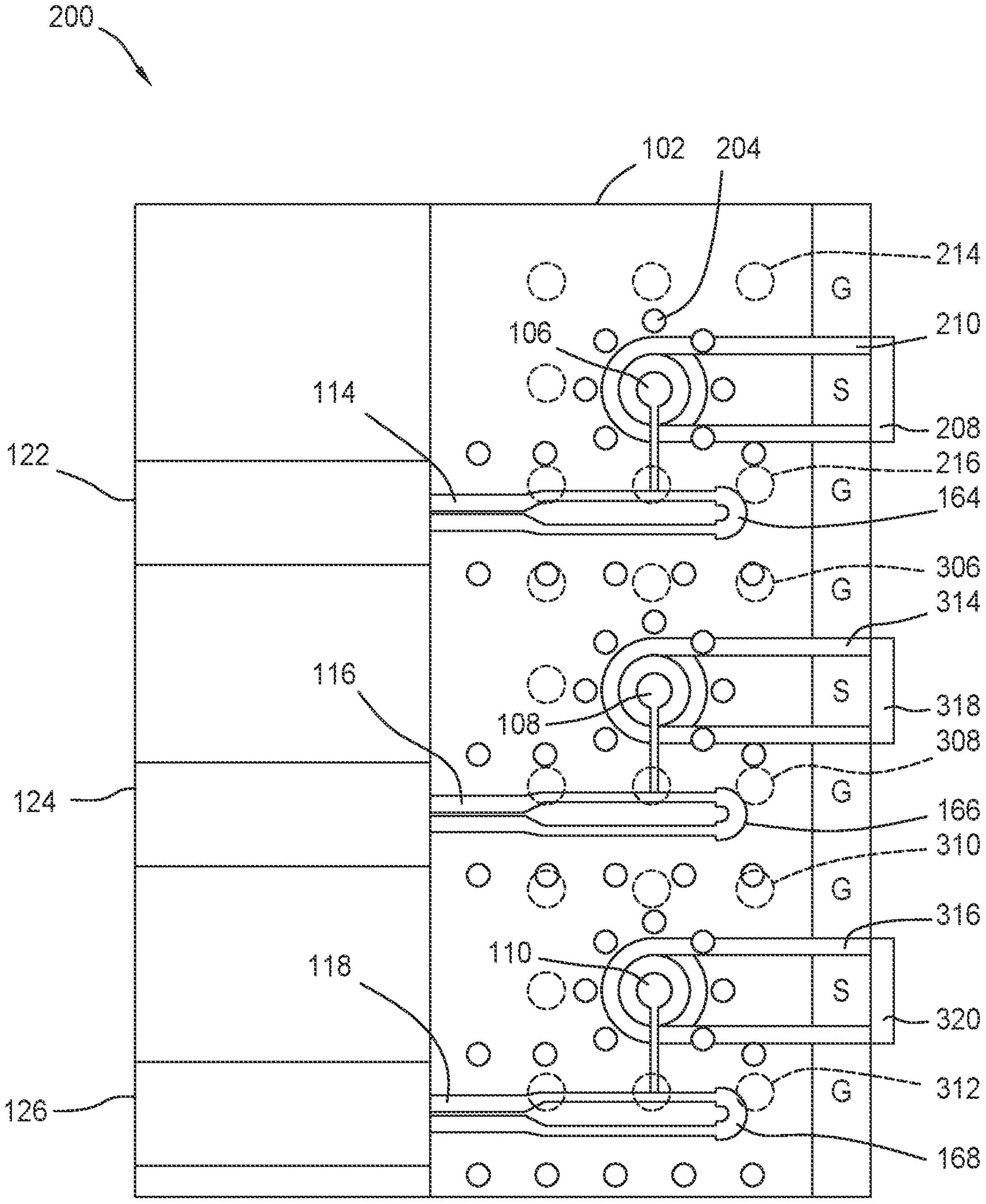
FIG. 3 illustrates a top view diagram of a portion of the integrated circuit device of FIGS. 1 and 2.

Referring to FIGS. 2 and 3, FIG. 2 illustrates a perspective view diagram of integrated circuit device 200 that includes a portion of IC device 100 of FIG. 1 mounted on the PCB 206 in accordance with selected embodiments of the present disclosure. FIG. 3 illustrates a top view diagram showing multiple channels of receiver circuitry 122-126 and other associated components of IC devices 100 and 200 of FIGS. 1 and 2. In the example shown in FIG. 2, one receive channel including signal via 106, balun 114 with widened U-shaped segment 164 and receiver circuitry 122 of processor die 104 are shown on substrate 102 and packaged in encapsulant 202. Ground vias 204 surround signal via 106. A first row of ground vias 214 can be included along the length of one side of balun 114, and a second row of ground vias 216 can be included along the length of another side of balun 114. Ground vias 204, 214, 216 at least partially shield balun 114 and signal via 106 from spurious electromagnetic waves (e.g., radio interference). Ground vias 204, 214, 216 can be connected to a ground metal layer of substrate 102 that can in turn be connected to a ground metal layer in PCB 206 through an array of solder balls 212 that may provide signal connections, ground connections, and power connections.

PCB 206 supports and electrically connects electrical or electronic components such as processor die 104 using conductive tracks, pads and other features etched from one or more sheet layers of conductive material laminated onto and/or between sheet layers of a non-conductive substrate. As best shown in FIG. 3, waveguides in the form of conductive tracks 210, 314, 316 can be included in a top metal layer of PCB 206 and wrap around a portion of corresponding signal vias 106, 108, 110. The ends of conductive tracks 210, 314, 316 extend from corresponding signal vias 106, 108, 110 to antenna ports 208, 318, 320 to transfer signals from the antenna 508 to signal vias 106, 108, 110.

Rows of ground vias 214, 216, 306, 308, 310, 312 as shown in dashed circles in FIG. 3 are included on PCB 206 (FIG. 2). Signal via 106 and conductive track 210 are between ground via rows 214 and 216. Ground via rows 216 and 306 are adjacent to one another. Signal via 108 and conductive track 314 are between ground via rows 306 and 308. Ground via rows 308 and 310 are adjacent to one another. Signal via 110 and conductive track 316 are between ground via rows 310 and 312.

It is noted that a similar configuration of conductive tracks, ground vias and antenna ports can be used for baluns 146, 148, 150, 152 and signal vias 138, 140, 142, 144 attached to transmitter circuitry 130-136 to transfer signals to antenna from transmitter circuitry 130-136.

The baluns 114, 116, and 118 are included and shown with widened U-shaped segments 164, 166, and 168, respectively. By including baluns 114, 116, 118 attached and adjacent to signal vias 106, 108, 110, there are two rows of ground vias 216/306, 308/310 in substrate 102 and PCB 206 between each signal via 106, 108, 110. The additional separation and grounding that is achieved by placing rows of ground vias adjacent to one another decreases interference with signals on signal via 106, 108, 110 and conductive traces 210, 314, 316, thereby improving performance of IC device 200.

Figure 4:
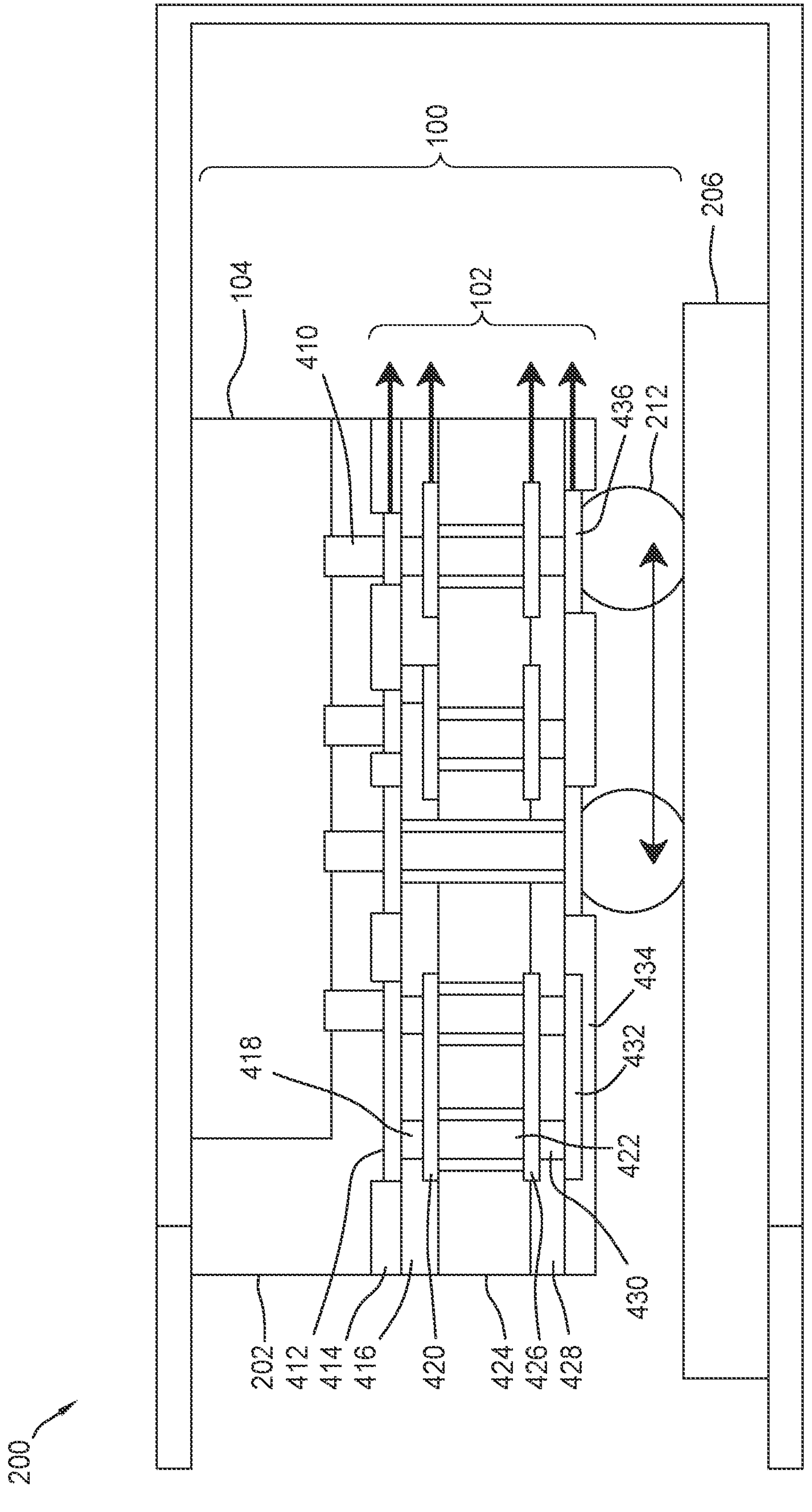
FIG. 4 illustrates a side cross-sectional view diagram of a portion of the integrated circuit device and printed circuit board of FIG. 1.

FIG. 4 illustrates a side cross-sectional view diagram of a portion of IC device 200 of FIG. 1 attached to printed circuit board 206 of FIG. 2. Processor die 104 is coupled to substrate 102 with conductive pillars 410. Substrate 102 includes metal layers 414, 420, 426, 432 between dielectric layers 416, 424, 428. Dielectric layer 424 can be a rigid core that is thicker than dielectric layers 416, 428 to provide structure that resists bending of substrate 102. Conductive vias 418, 422, 430 can be formed in dielectric layers 416, 424, 428 to connect traces in metal layers 414, 420, 426, 432 with one another as specified by a routing design. IC device 200 is coupled to substrate 206 using an array of solder balls 212. Various power ground, power, and data signals can be communicated between integrated circuit 100 and other components on PCB 206 through conductive traces (not shown) on PCB 206. As used herein, electrical ground can be considered a supply voltage VSS.

Baluns 114-120 and 146-152 as shown in FIG. 1 can be formed in metal layer 412 or other suitable location in substrate 102.

Figure 5:
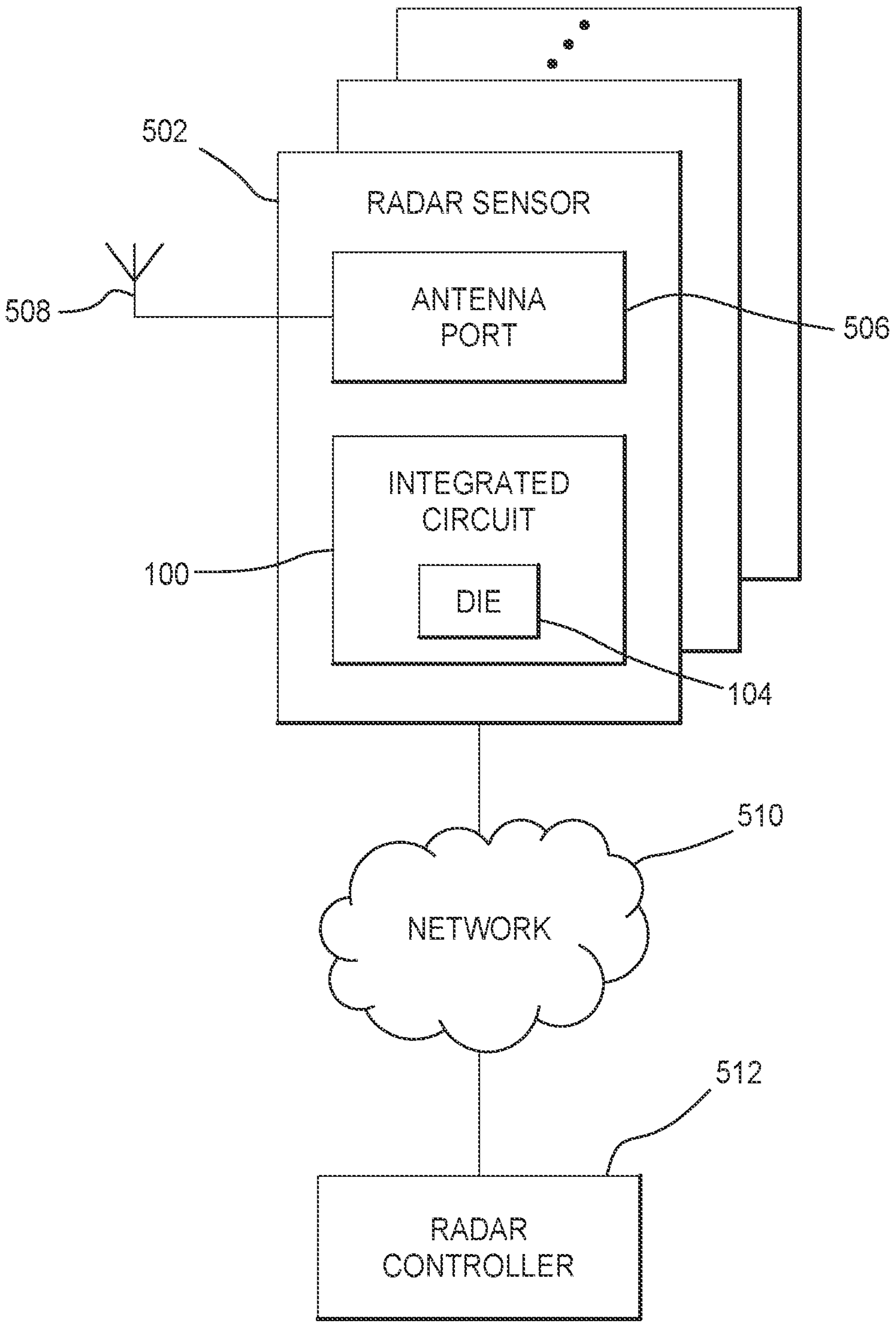
FIG. 5 illustrates a block diagram of an embodiment of a vehicle RADAR system in accordance with selected embodiments of the present disclosure.

FIG. 5 illustrates a block diagram of an embodiment of a vehicle RADAR system 500 in accordance with selected embodiments of the present disclosure. System 500 can include a RADAR sensor 502 having one or more antenna ports 506 coupled to one or more corresponding antenna 508, and packaged IC device 100 that includes processor die 104 on printed circuit board 206 (FIG. 2). Packaged IC device 100 may be a flip chip chip scale package or other suitable package format. RADAR sensor 502 may be used as, or as part of, a RADAR system for a vehicle such as an automobile. A number of RADAR sensors 502 may be included at different locations around the vehicle to enable collision avoidance, Adaptive Cruise Control (ACC), Autonomous Emergency Braking (AEB), blind Spot Detection (BSD), Cascaded Imaging Radar (IMR), Front/Rear Cross-traffic-Functions (FCTA/RCTA), Lane Change Assistance (LCA), Park Assist (PA), Reverse-Autonomous Emergency Braking (R-AEB) capability, and other functions. System 500 can further comprise network 510, such as a controller area network (CAN), FlexRay, and/or high-speed Ethernet network, that communicatively couples RADAR sensors 502 to RADAR controller 512 and/or other suitable processing devices.

Packaged IC device 100 emits a RADAR signal, and antenna 508 radiates the RADAR signal. If an object is near, the radiated RADAR signal may reflect off the object and the reflected signal may be received by antenna 508. Packaged IC device 100 may receive the reflected RADAR signal from antenna 508, and MMIC die 104 may process the reflected RADAR signal. MIMIC die 104 may provide RADAR functionality and/or automobile RADAR functionality in some contexts. Die 104 transmits digital information about the RADAR signal or RADAR return to network 510.

RADAR controller 512 receives the digital information from network 510, processes the information, and determines whether an event or situation of interest is impending. In this situation, the RADAR controller 512 may send a warning or notification to a display or other device to issue a warning. In an embodiment, RADAR controller 512 may send a command to an automatic vehicle steering and braking controller to take action to avoid a collision, for example to steer away from the impending collision. Such collision avoidance steering commands may be conditioned on RADAR controller 512 determining, based on inputs from other RADAR sensors 502, that steering away from the impending collision does not steer into a different collision situation.

It is understood that IC device 100 taught herein may advantageously perform other functions and be used in other systems and designs, unrelated to automobile RADARs, that rely on a narrowband MMIC die 104. While an automobile RADAR MMIC is an exemplary embodiment of the teachings of the present disclosure, it is understood that application of these teachings to other non-automotive and non-RADAR applications is consistent with the present disclosure.

Figure 6:
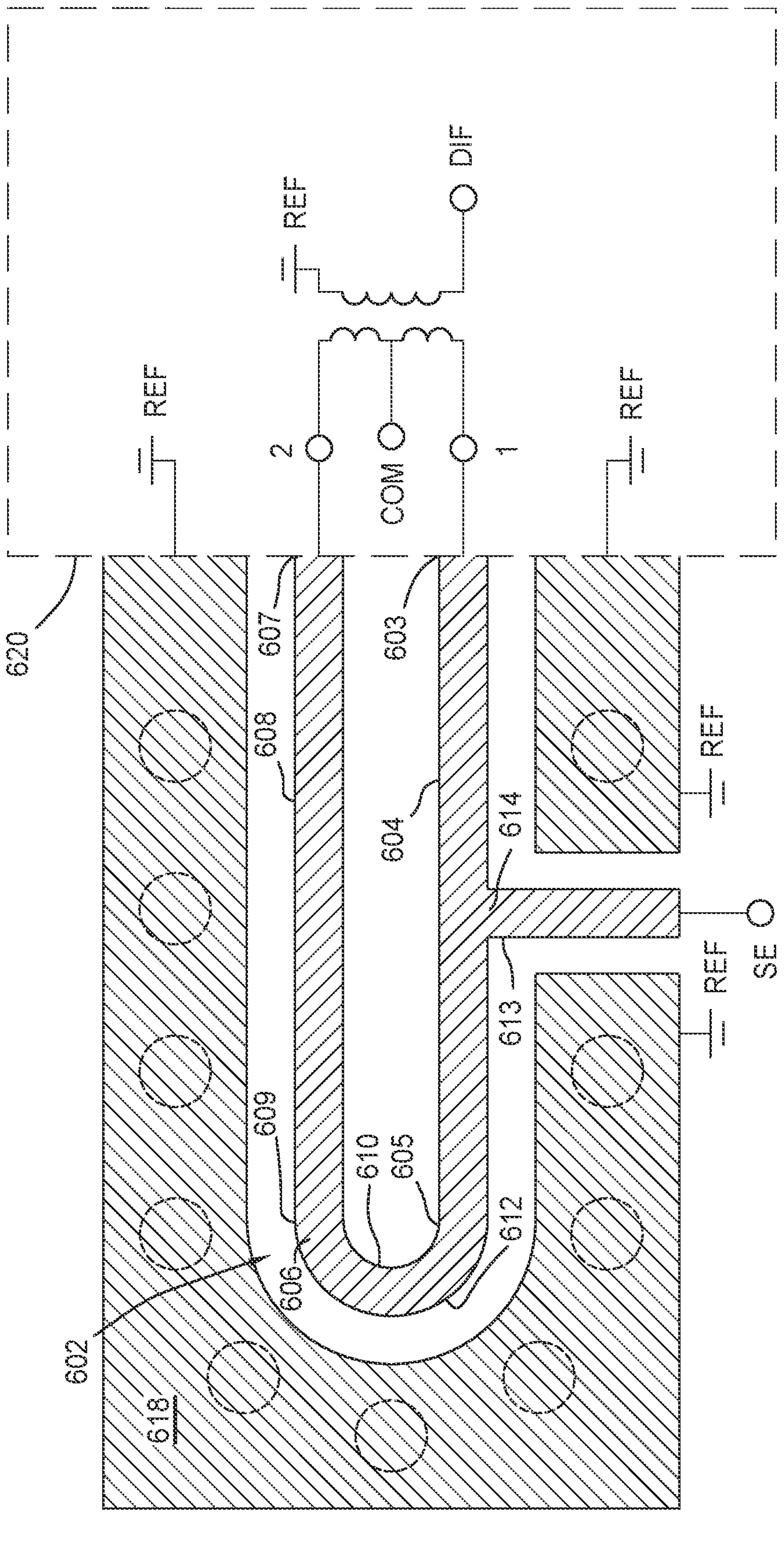
FIG. 6 (PRIOR ART)
FIG. 6 is a simplified depiction of a balun implemented according to a prior configuration which is shown electrically interfaced with an ideal transformer to facilitate discussion of balun electrical behavior.

FIG. 6 is a simplified depiction of a balun 602 implemented according to the prior configuration which is shown electrically interfaced with an ideal transformer 620 to facilitate the following discussion of balun electrical behavior. The balun 602 is constructed out of a microstrip line shown with shading, in which a microstrip line is a metal microstrip line having a thickness generally smaller than its width running over a metal ground plane at a height which is similar to the microstrip line width. To achieve a compact layout that can be integrated into an IC package, the balun 602 is squeezed into a hairpin shape. The hairpin-shaped balun 602 includes first and second conductive microstrip linear segments 604 and 608 and a conductive microstrip U-shaped segment 606. The linear segment 604 is formed between a first end 603 and a second end 605, and the linear segment 608 is formed between a first end 607 and a second end 608. In addition, the linear segments 604 and 608 are in parallel with each other forming the legs of the balun 602. The linear segments 604 and 608 have inner sides separated by a first distance and have outer sides separated by a second distance that is greater than the first distance based on the widths of the linear segments.

The U-shaped segment 606 has a first end integrally formed with the linear segment 604 at its second end 605, has a second end integrally formed with the linear segment 608 at its second end 609. In this context, the term "integrally formed" means a continuous conductive microstrip formation or structure. The U-shaped segment 606 has an inner diameter 610 that is substantially the same as the first distance between the inner sides of the linear segments 604 and 608, has an outer diameter 612 that is substantially the same as the second distance between the outer sides of the linear segments 604 and 608, and has a width that is substantially the same as the widths of the linear segments 604 and 608. The linear segments 604 and 608 form the legs and the U-shaped segment 606 forms the semicircular bend of the hairpin-shaped balun 602.

The linear segments 604 and 608 and the U-shaped segment 606 of the balun 602 are made in a first metal layer of a substrate (not shown), which may be similar to the substrate 102 previously described. A co-planer ground metal 618 is also formed in the first metal layer of the substrate surrounding the balun 602. The ground metal 618 does not electrically contact the microstrip of the balun 602 but instead the ground metal 618 is separated from the outer periphery of the balun 602 by a substantially uniform gap or spacing. The ground metal 618 is shown in simplified form with rectilinear sides but it is understood that the ground metal 618 may be extended in each direction along the first metal layer and is not further described. Multiple vias may be provided shown generally as dashed circles electrically coupling the ground metal 618 to a second ground metal (not shown) formed on a second metal layer (not shown) of the substrate. Although not shown, the second ground metal located beneath (or above) the balun 602 extends up to and beyond the entire length and width of balun 602. Generally, ground currents flow in either or both first and second ground metals, and therefore electromagnetic signals can propagate in a microstrip transmission mode, a co-planar transmission line mode, or a combination of both. It is noted that either the first or second ground metal may be omitted in different configurations.

In the simplified depiction, the balun 602 is electrically interfaced with the ideal transformer 620. As shown, the first end 603 of the linear segment 604 is electrically coupled to a first pin 1 and the first end 607 of the linear segment 608 is electrically coupled to a second pin 2 of the transformer 620. Pins 1 and 2 are located at either end of a primary coil of the transformer 620, which has a center tap coupled to a common (COM) pin. The transformer 620 has a secondary coil coupled between a reference (REF) node and a differential (DIF) pin. The ground metal is also coupled to the REF node developing a reference voltage level, such as ground (GND). In addition, a single ended (SE) pin is electrically coupled to one end of another conductive microstrip linear segment 613, having its other end integrally formed at a location 614 along the linear segment 604. Although the location 614 is shown substantially at the center of the linear segment 604, the actual intersection location is determined by the wavelength of the intended target operating frequency of the signal being processed by the balun as further described herein. The linear segment 613 is also separated on either side from the ground metal 618 by the uniform distance.

The characteristic impedance of the transmission line formed by the microstrip of the balun 602 is determined by multiple factors, including its width and its height compared to the relative distance to the ground plane, in which the ground plane is formed not only by the ground metal 618 shown (if provided) but also the second ground metal previously described (if provided). In general, assuming a substantially uniform distance from the ground plane, for a given microstrip height, the width of the microstrip sets the characteristic impedance Z0 of the transmission line, which is calculated from the ratio between the line inductance and line capacitance to the ground plane of the transmission line. The widths of the linear segments 604 and 608 and the U-shaped segment 606 and the distances to the ground plane are substantially uniform so that the balun 602 maintains the same characteristic impedance Z0 throughout its length.

At an intended target frequency of operation (e.g., an RF signal at about 78 GHz as a non-limited example), the electrical length of the conductive microstrip path along the balun 602 from the SE to pin 2 is a half wavelength longer than the electrical length from the SE pin to pin 1. According to intended operation, an RF signal at the target frequency arriving at the SE terminal should be directed towards the DIF terminal and not towards the common mode (COM) terminal. Also, any RF signal at the target frequency arriving at the DIF terminal should be directed towards the SE terminal and not towards the COM terminal. To describe the transmission and reflection of RF signals it is customary to use scatter parameters (S-parameters). For this three terminal (SE, DIF, COM) circuit there are 6 relevant S-parameters. Three of them describe the transmissions between the terminals and can have a magnitude between 0 and 1 depending on what fraction of the signal voltage is transmitted. Three of them are terminal mismatch parameters, again with a magnitude between 0 and 1, which describe whether or not a terminal is willing to accept the RF signal, in which it is reflected back to its source. Typically, when the balun 602 is not able to transfer an incident signal to one of the other terminals, it reflects it back to its source. In addition a small part of the signal gets lost due to balun metal resistances and balun dielectric material losses.

Testing performed using an actual balun (not shown) configured substantially according to the balun 602 with uniform width throughout its length has revealed that the S-parameters are misaligned. In particular, the three S-parameters related to the handling of the common mode signals demonstrate their intended behavior at a higher frequency compared to the other three S-parameters. At the intended target frequency of operation, this S-parameter misalignment results in a greater sensitivity to common mode termination impedance, more sensitivity to process variations and tolerances, and also results in overall insertion loss of the RF signals in either direction. It is understood that S-parameter alignment is a desirable balun property. It makes the balun loss less sensitive to the common mode termination impedance changes and less sensitive to process variations and tolerances.

It has been determined that due to the close proximity of the microstrip transmission segments 604 and 608, inductive and capacitive coupling occur between them. When the current in the transmission linear segments 604 and 608 flows in opposite directions, inductive coupling reduces the effective inductance and the capacitive coupling increases the effective capacitance. As a result, the effective characteristic impedances along portions of the linear segments are reduced relative to Z0. The characteristic impedance Z0 of the transmission line of the U-shaped segment 606, however remains substantially unchanged. Furthermore the transmission line propagation delays and losses of those portions of the linear segments that flow in the same directions are largely unaffected.

Figure 7:
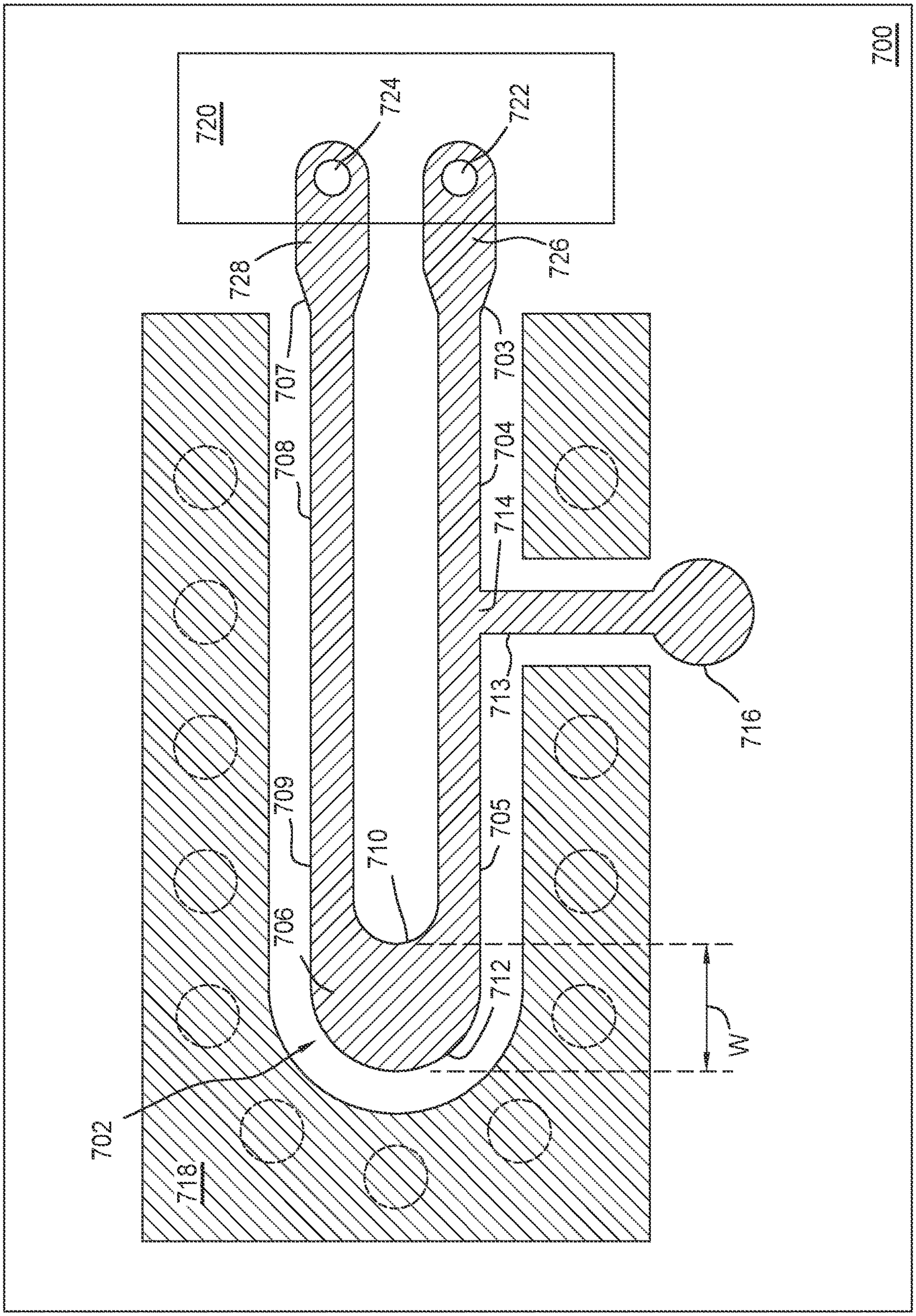
FIG. 7 is a simplified top view diagram of a balun implemented according to an embodiment of the present disclosure.

FIG. 7 is a simplified top view diagram of a balun 702 implemented according to an embodiment of the present disclosure. The balun 702 is similar to the balun 602 in which it is also made of conductive microstrip that is formed in the metal layer of a substrate 700, which may be similar to the chip substrate 102 previously described. The balun 702 also has a hairpin-shape and includes first and second conductive microstrip linear segments 704 and 708 and a conductive microstrip U-shaped segment 706. The linear segment 704 is formed between a first end 703 and a second end 705, in which the linear segment 704 is substantially similar to the linear segment 604 having about the same width and length. Also, the linear segment 708 is formed between a first end 707 and a second end 708, in which the linear segment 708 is substantially similar to the linear segment 608 with about the same width and length. In addition, the linear segments 704 and 708 are in parallel with each other forming the legs of the balun 702. Similar to the balun 602, the linear segments 704 and 708 have inner sides separated by a first distance and have outer sides separated by a second distance that is greater than the first distance.

The U-shaped segment 706 has a first end integrally formed with the linear segment 704 at its second end 705 and has a second end integrally formed with the linear segment 708 at its second end 709. The U-shaped segment 706, however, is extended in the longitudinal direction relative to the linear segments 704 and 708 such that the conductive microstrip of the U-shaped segment 706 is wider than the widths of the linear segments 704 and 708, and thus is wider in the longitudinal direction as compared to the U-shaped segment 607 of the balun 602. The U-shaped segment 706 has an inner diameter 710 that is substantially the same as the first distance between the inner sides of the linear segments 704 and 708, and also has an outer diameter 712 that is substantially the same as the second distance between the outer sides of the linear segments 704 and 708. The outer diameter 712 of the U-shaped segment 706, however, is extended in the longitudinal direction such that a width "W" of the conductive microstrip of the U-shaped segment 706 is greater than the uniform width of the U-shaped segment 607.

In a similar manner as described for the balun 602 in FIG. 6, the linear segments 704 and 708 and the U-shaped segment 706 of the balun 702 are made in a first metal layer of a substrate (not shown), which may be similar to the substrate 102 previously described. A co-planer ground metal 718 is also formed in the first metal layer of the substrate surrounding the balun 702. The ground metal 718 does not electrically contact the microstrip of the balun 702 but instead the ground metal 718 is separated from the outer circumference of the balun 702 by a substantially uniform gap or spacing. The ground metal 718 is shown in simplified form with rectilinear sides but it is understood that the ground metal 718 may be extended in each direction along the first metal layer and is not further described. Multiple vias may be provided shown generally as dashed circles electrically coupling the ground metal 718 to a second ground metal (not shown) formed on a second metal layer (not shown) of the substrate. Although not shown, the second ground metal located beneath (or above) the balun 702 extends up to and beyond the entire length and width of balun 702.

A primary difference between the U-shaped segment 606 of the balun 602 and the U-shaped segment 706 of the balun 702, including microstrip height and distance(s) to the ground plane, is the relative width of the microstrip. In this manner, given substantially all other factors being about the same, the U-shaped segment 706 has a second characteristic impedance that is less than the first characteristic impedance of the U-shaped segment 606. Thus, as compared to the balun 602, the width of the U-shaped segment 706 has been increased in such a manner to restore S-parameter alignment. The rounded corners may not be essential, but may serve to increase manufacturability and overall performance by reducing microstripline discontinuities. Increasing the width of the U-shaped segment (from 606 to 706) may also result in adjusting (e.g., decreasing) the overall length of the conductive microstrip linear sections 704 and 708 (along with any corresponding adjustments in the ground metal 718) in order to achieve S-parameter alignment. The conductive microstrip linear segment 613 is replaced by a conductive microstrip linear segment 713, which is also integrally formed at one end along the length of the linear segment 704 at a location 714 and is electrically coupled at its other end to a signal via 716. The collective geometries of the conductive microstrip linear segments 704 and 708 and the U-shaped segment 706 and the location 714 are designed or otherwise selected to maintain the half wavelength separation of the distance between the location 714 and the first ends 703 and 707 at the target frequency of operation.

Also included is communication circuitry 720 provided or otherwise mounted on the substrate 700 including a first electrical port 722 and a second electrical port 724 collectively forming a differential port for conveying a differential signal. The communication circuitry 720 may be incorporated within a separate IC die mounted to the substrate 700 with external conductive ports 722 and 724. A first conductive trace 726 and a second conductive trace 728 are routed from the first end 704 of the first linear segment 704 and the first end 707 of the second linear segment 708 to the first and second ports 722 and 824, respectively, of the communication circuitry 720. The communication circuitry 720 may represent any of the receiver circuitries 122-128 for receiving differential RF signals or any of the transmitter circuitries 130-136 for providing differential RF signals for transmission. In an alternative embodiment, the communication circuitry 720 may be configured as transceiver circuitry having a receiver mode for receiving signals and a transmitter mode for transmitting signals.

It is noted that the illustrated conductive traces 726 and 728 are wider than the uniform widths of the linear segments 704 and 708 of the balun 702 to constitute a quarter wavelength impedance transformer to adjust the differential signal impedance level to that desired on the die of the communication circuitry 720. The conductive traces 726 and 728 are configured in an identical or at least perfectly symmetrical manner, so that they do not otherwise significantly impact the differential signal.

In operation, a single-ended signal having a specified operation frequency received at the signal via 716 is split by the balun 702 into a differential signal between the first and second differential contact locations at the ends 703 and 707 of the linear segments 704 and 708, in which the differential signal is conveyed to the ports 722 and 724 of the communication circuitry 720.

The separate components of the differential signal arriving at the communication circuitry 720 have about equal amplitude with a 180-degree phase difference. In a similar manner, a differential signal output by the communication circuitry 720 at the specified operation frequency with a 180-degree phase difference at the differential ports 722 and 724 is combined by the balun 702 into a single-ended signal provided to the signal via 730. In one embodiment, the target frequency of operation is about 78 GHz.

The compact planar balun 702 has shown to improve S-parameter alignment, to minimize overall insertion loss, and to achieve insensitivity to common mode termination and process tolerances. Although the two opposite linear sections of microstrip transmission line in the hairpin leg segments couple inductively, which modifies their characteristic impedance in an otherwise unfavorable manner, the width W of the U-shaped segment 706 is increased (relative to the uniform width of the U-shaped segment 606 of the balun 602) to compensate for, and counteract, the inductive coupling. In one embodiment, the amount of the width increase, along with any linear segment length modification and any adjustment of the location 714, may be collectively established experimentally or through electromagnetic calculations.

The configuration of the compact planar balun 702 with widened U-shaped segment 706 may be used to implement the baluns 114-120 with widened U-shaped segments 164-170, respectively, and to implement the baluns 146-152 with widened U-shaped segments 186-192, respectively of FIG. 1 (and also including balun 114 with widened U-shaped segment 164 shown in FIG. 2, and baluns 114, 116, and 118 with widened U-shaped segments 164, 166, and 168, respectively).

Figure 8:
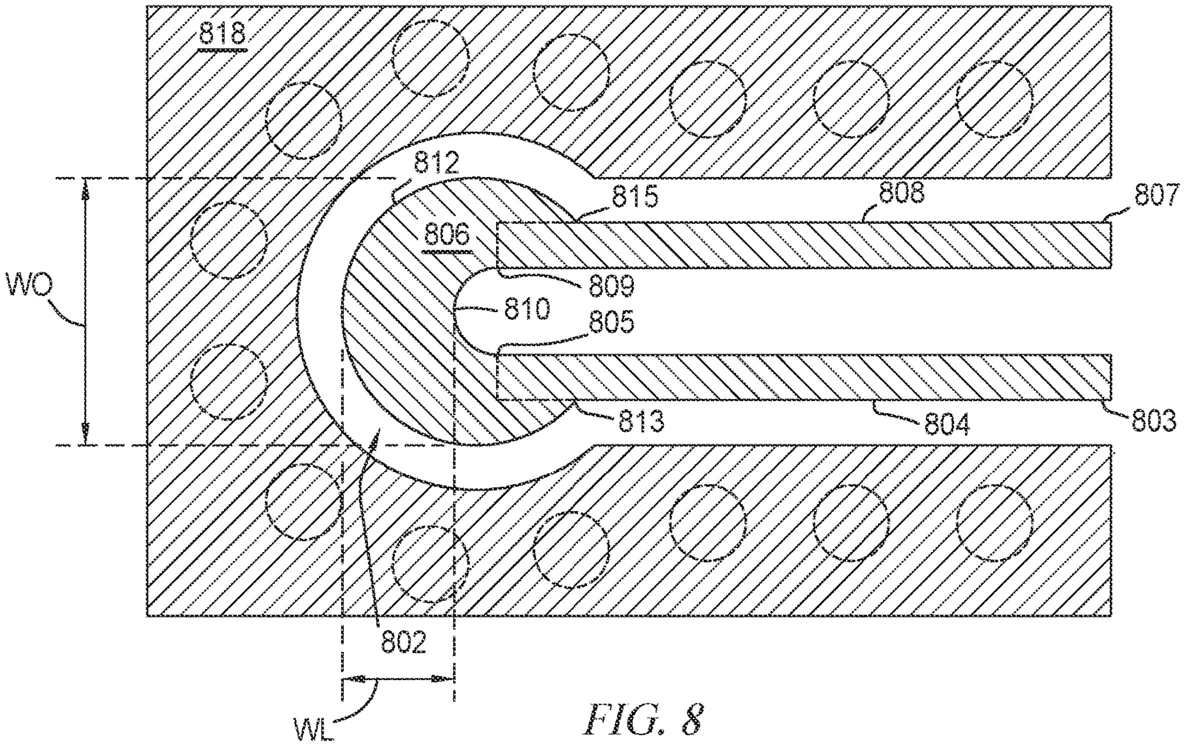
FIG. 8 is a simplified top view diagram of a balun implemented according to another embodiment of the present disclosure.

FIG. 8 is a simplified top view diagram of a balun 802 implemented according to another embodiment of the present disclosure. The balun 802 is similar to the balun 702 in which it is also made of conductive microstrip that is formed in the metal layer of a substrate (not shown). The balun 802 also has a hairpin-shape and includes first and second conductive microstrip linear segments 804 and 808 and a conductive microstrip U-shaped segment 806. The linear segment 804 is formed between a first end 803 and a second end 805, in which the linear segment 804 is substantially similar to the linear segment 704 having about the same width and about the same combined length. Also, the linear segment 808 is formed between a first end 807 and a second end 808, in which the linear segment 808 is substantially similar to the linear segment 708 with about the same width and about the same combined length.

The U-shaped segment 806 has a first end integrally formed with the linear segment 804 near its second end 805 and has a second end integrally formed with the linear segment 808 near its second end 809. In this case, however, the conductive microstrip of the U-shaped segment 806 is extended and widened in both the longitudinal direction and both orthogonal directions such that is has a wider longitudinal width "WL" and a wider orthogonal width "WO" that extends wider than the outer sides of the linear segments 804 and 808. The U-shaped segment 806 has an inner diameter 810 that is substantially the same as the inner diameter 710 of the U-shaped segment 706 (e.g., the first distance). The U-shaped segment 806, however, has an outer diameter 812 that is larger than the diameter 712 of the U-shaped segment 706 to extend the width WO in the orthogonal direction. Thus, the outer diameter 812 of the U-shaped segment 806 is greater than the second distance between the outer sides of the linear segments 804 and 808.

In one embodiment, the outer diameter 812 may terminate at the ends 805 and 809 of the linear segments 804 and 808. In the illustrated embodiment, however, the outer diameter 812 extends past both ends 805 and 809 to locations 813 and 815 along the widths of the linear segments 804 and 808, respectively, as illustrated. The overlapped portions of the linear segments 804 and 808 are shown with dashed lines, although it is understood that the U-shaped segment 806 is integrally formed with both of the linear segments 804 and 808.

A co-planer ground metal 818 is also formed in the first metal layer of the substrate surrounding the balun 802. The ground metal 818 does not electrically contact the microstrip of the balun 802 but instead the ground metal 818 is separated from the outer circumference of the balun 802 by a substantially uniform gap or spacing. The ground metal 818 is shown in simplified form with rectilinear sides but it is understood that the ground metal 818 may be extended in each direction along the first metal layer and is not further described. Multiple vias may be provided shown generally as dashed circles electrically coupling the ground metal 818 to a second ground metal (not shown) formed on a second metal layer (not shown) of the substrate. Although not shown, the second ground metal located beneath (or above) the balun 802 extends up to and beyond the entire length and width of balun 802.

FIG. 8 is further simplified by omitting any depiction of a substrate, single-ended connections and corresponding conductive traces, as well as differential connections and corresponding communication circuitry and ports and connecting conductive traces and the like. Similar to the balun 702, the linear segments 804 and 808 have inner sides separated by a first distance and have outer sides separated by a second distance that is greater than the first distance.

As compared to the balun 602 having the U-shaped segment 606 with a first characteristic impedance, the wider U-shaped segment 806 has a third characteristic impedance that is less than the first characteristic impedance. The third characteristic impedance of the U-shaped segment 806 may be similar to or may even be less than the second characteristic impedance of the U-shaped segment 706 of the balun 702.

As compared to the balun 602, the width of the U-shaped segment 806 has been increased in such a manner to restore S-parameter alignment. The rounded corners may not be essential, but may serve to increase manufacturability and overall performance by reducing microstripline discontinuities. Increasing the width of the U-shaped segment (from 606 to 806) may also result in adjusting (e.g., decreasing) the overall length of the conductive microstrip linear sections 804 and 808 in order to achieve S-parameter alignment. The collective geometries of the conductive microstrip linear segments 804 and 808 and the U-shaped segment 806 and the location of an electrically coupled single-ended connection (not shown) are designed or otherwise selected to maintain the half wavelength separation of the distance between the single-ended connection location and the first ends 803 and 807 at the target frequency of operation.

When the balun 802 is used rather than the balun 702, operation is similar for converting between single-ended and differential signals at the target operating frequency. The compact planar balun 802 has also shown to improve S-parameter alignment, to minimize overall insertion loss, and to achieve insensitivity to common mode termination and process tolerances. Although the two opposite linear sections of microstrip transmission line in the hairpin leg segments couple inductively, which modifies their characteristic impedance in an otherwise unfavorable manner, the width of the U-shaped segment 806 is increased (relative to the uniform width of the U-shaped segment 606 of the balun 602) to compensate for, and counteract, the inductive coupling. In one embodiment, the amount of the width increase, along with any linear segment length modification and any adjustment of the single-ended connection location may be collectively established experimentally or through electromagnetic calculations.

The configuration of the compact planar balun 802 with widened U-shaped segment 806 may be used to implement the baluns 114-120 with widened U-shaped segments 164-170, respectively, and to implement the baluns 146-152 with widened U-shaped segments 186-192, respectively of FIG. 1 (and also including balun 114 with widened U-shaped segment 164 shown in FIG. 2, and baluns 114, 116, and 118 with widened U-shaped segments 164, 166, and 168, respectively).

Figure 9:
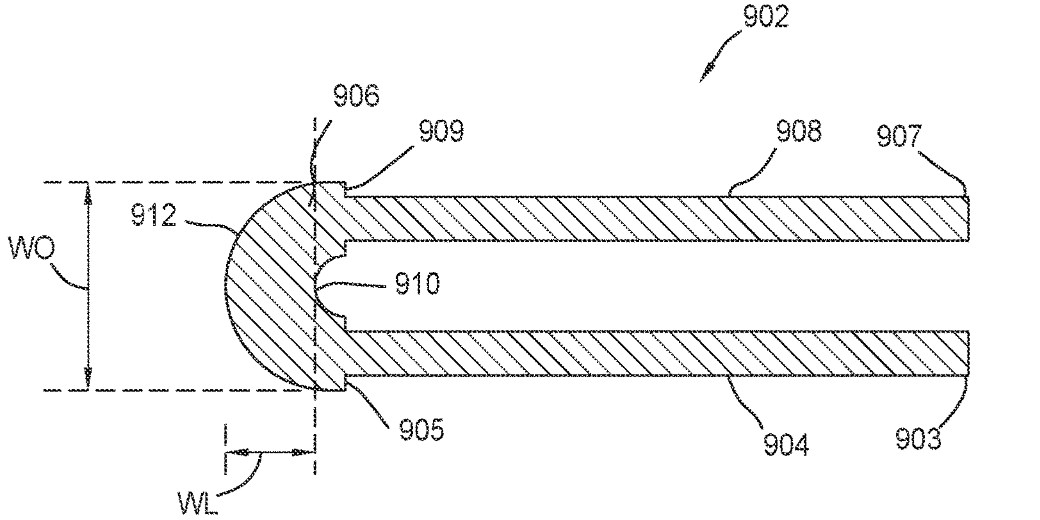
FIG. 9 is a simplified top view diagram of a balun implemented according to yet another embodiment of the present disclosure.

FIG. 9 is a simplified top view diagram of a balun 902 implemented according to yet another embodiment of the present disclosure. The balun 902 is similar to the baluns 702 and 802 in which it is also made of conductive microstrip that is formed in the metal layer of a substrate (not shown). The balun 902 also has a hairpin-shape and includes first and second conductive microstrip linear segments 904 and 908 and a conductive microstrip U-shaped segment 906. The linear segment 904 is formed between a first end 903 and a second end 905, in which the linear segment 904 is substantially similar to the linear segment 704 having about the same width and about the same combined length. Also, the linear segment 908 is formed between a first end 907 and a second end 909, in which the linear segment 908 is substantially similar to the linear segment 708 with about the same width and about the same combined length.

The U-shaped segment 906 has a first end integrally formed with the linear segment 904 at its second end 905 and has a second end integrally formed with the linear segment 908 at its second end 909. As with the case of the balun 802, however, the conductive microstrip of the U-shaped segment 906 is thickened such that is has a wider longitudinal width WL and a wider orthogonal width WO that extends wider than the outer sides of the linear segments 904 and 908. The U-shaped segment 906 has an inner diameter 910 that is smaller than the inner diameter 710 of the U-shaped segment 706 and also has an outer diameter 912 that is larger than the diameter 712 of the U-shaped segment 706. In the illustrated embodiment, both ends of the U-shaped segment 906 terminate at the ends 905 and 909 of the linear segments 904 and 908.

FIG. 9 is simplified by omitting any depiction of a substrate, single-ended connections and corresponding conductive traces, as well as differential connections and corresponding communication circuitry and ports and connecting conductive traces and the like. Similar to the baluns 702 and 802, the linear segments 904 and 908 have inner sides separated by a first distance and have outer sides separated by a second distance that is greater than the first distance.

In addition, FIG. 9 is simplified by omitting any depiction of ground metals or layers. It is understood that a co-planer ground layer may be formed about the periphery of the balun 902 separated by a substantially uniform gap or spacing in a similar manner as previously described for the ground metals 718 and 818, and that additional ground layers may be included.

Since the inner diameter 910 of the U-shaped segment 906 is smaller than the first distance between the inner sides of the linear segments 904 and 908 and since the outer diameter 912 is greater than the second distance between the outer sides of the linear segments 904 and 908, both ends of the U-shaped segment 906 significantly overlap the uniform width of the ends 905 and 909 of the linear segments 904 and 908 as shown. As compared to the balun 602 having the U-shaped segment 606 with a first characteristic impedance, and assuming a similar ground layer configuration, the wider U-shaped segment 906 has a fourth characteristic impedance that is less than the first characteristic impedance. The fourth characteristic impedance of the U-shaped segment 906 may be similar to or may even be less than the second and third characteristic impedances of the U-shaped segments 706 and 806 of the baluns 702 and 802, respectively.

As compared to the balun 602, the width of the U-shaped segment 906 has been increased in such a manner to restore S-parameter alignment. The interface between the U-shaped segment 906 and the linear segments 904 and 908 are illustrated with orthogonal corners, the square-corners may be rounded to increase manufacturability and overall performance by reducing microstripline discontinuities. Increasing the width of the U-shaped segment (from 607 to 906) may also result in adjusting (e.g., decreasing) the overall length of the conductive microstrip linear sections 904 and 908 in order to achieve S-parameter alignment. The collective geometries of the conductive microstrip linear segments 904 and 908 and the U-shaped segment 906 and the location of an electrically coupled single-ended connection (not shown) are designed or otherwise selected to maintain the half wavelength separation of the distance between the single-ended connection location and the first ends 903 and 907 at the target frequency of operation.

When the balun 902 is used rather than the balun 602, operation is similar for converting between single-ended and differential signals at the target operating frequency. The compact planar balun 902 has also shown to improve S-parameter alignment, to minimize overall insertion loss, and to achieve insensitivity to common mode termination and process tolerances. Although the two opposite linear sections of microstrip transmission line in the hairpin leg segments couple inductively, which modifies their characteristic impedance in an otherwise unfavorable manner, the width of the U-shaped segment 906 is increased (relative to the uniform width of the U-shaped segment 606 of the balun 602) to compensate for, and counteract, the inductive coupling. In one embodiment, the amount of the width increase, along with any linear segment length modification and any adjustment of the single-ended connection location may be collectively established experimentally or through electromagnetic calculations.

Figure 10:
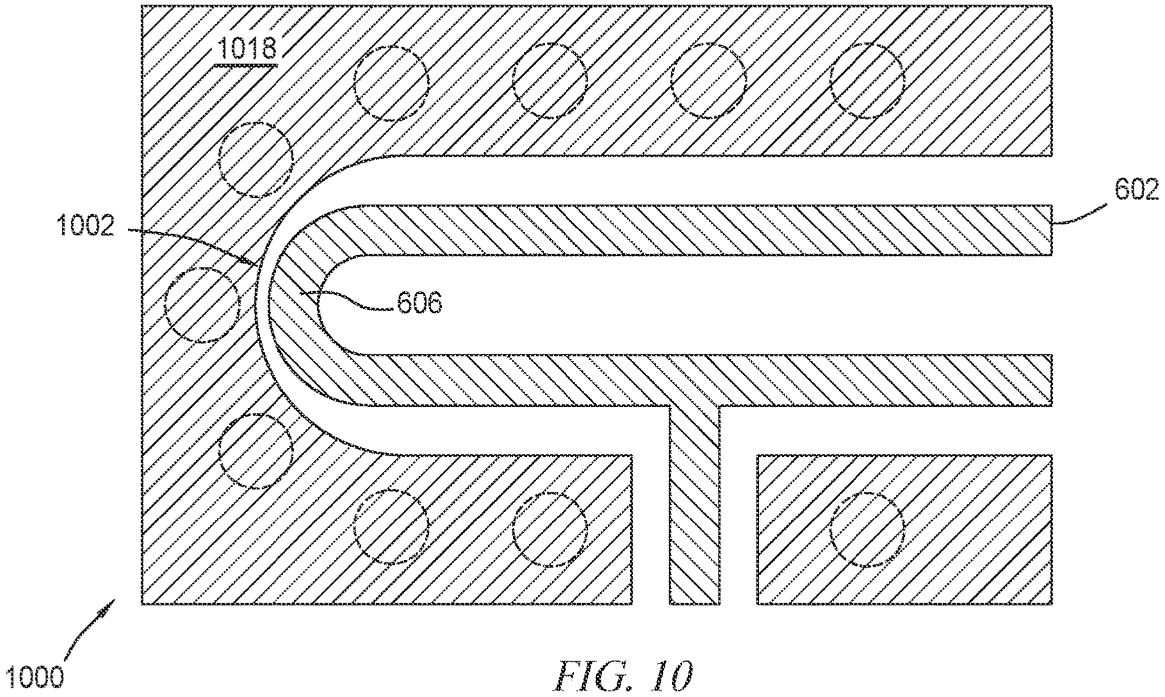
FIG. 10 is a simplified top view diagram of a balun configuration implemented according to still another embodiment of the present disclosure using a balun according to the prior configuration with modified ground metal positioned closer to the U-shaped segment.

FIG. 10 is a simplified top view diagram of a balun configuration 1000 implemented according to still another embodiment of the present disclosure. The balun configuration 1000 includes the balun 602 implemented in substantially the same manner as previously described in FIG. 6. The balun configuration 1000, however, includes a co-planer ground metal 1018 similar to the ground metal 618 in which it separated from the linear segments of the balun 602 by a substantially uniform gap or spacing. The ground metal 1018, however, has a surface 1002 formed substantially closer to the outer circumference of the U-shaped segment 606 than the uniform gap or spacing. As compared to the balun configuration shown in FIG. 6 in which the U-shaped segment 606 has a first characteristic impedance, the ground metal 1018 positioned closer to the U-shaped segment 606 forming a narrower gap causes the U-shaped segment 606 to have a fifth characteristic impedance that is less than the first characteristic impedance. As compared to the balun 602 of the configuration shown in FIG. 6, the characteristic impedance of the U-shaped segment 606 has been decreased by closer proximity to the ground metal in such a manner as to restore S-parameter alignment.

Figure 11:
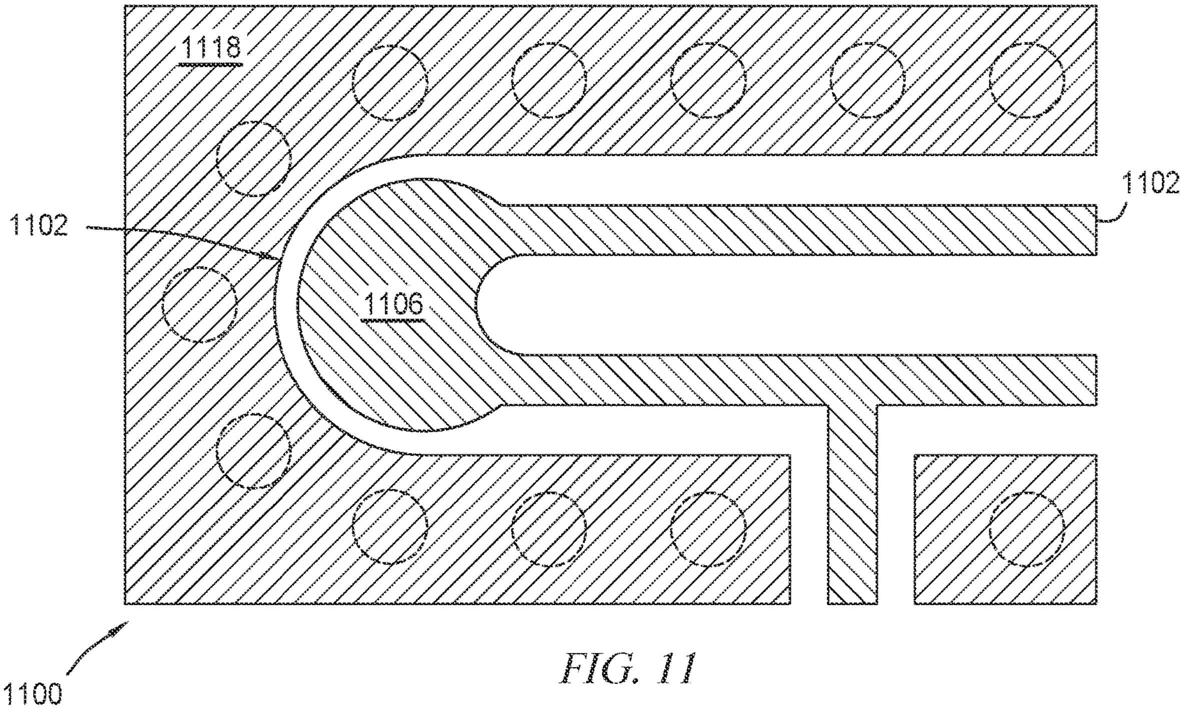
FIG. 11 is a simplified top view diagram of another balun configuration implemented according to still yet another embodiment of the present disclosure including a combination of a wider U-shaped segment and closer ground metal for achieving S-parameter alignment.

FIG. 11 is a simplified top view diagram of a balun configuration 1100 implemented according to still yet another embodiment of the present disclosure including a combination of techniques for achieving S-parameter alignment. The balun configuration 1100 includes a hairpin-shaped balun 1102 implemented in substantially similar manner as the balun 802 or the balun 902 with a wider U-shaped segment 1106. Assuming the same ground metal configuration as previously described, the wider U-shaped segment 1106 modifies the characteristic impedance as compared to the uniform width U-shaped segment 606 of the balun 602 as previously described. In this case, however, the balun configuration 1100 further includes a co-planer ground metal 1118 that is similar to the ground metal 1018 in which it separated from the linear segments of the balun 1102 by a substantially uniform gap or spacing. The ground metal 1118, however, has a surface 1102 formed substantially closer to the outer circumference of the U-shaped segment 1106 than the uniform gap or spacing. As compared to the balun configuration shown in FIG. 6 in which the U-shaped segment 606 has a first characteristic impedance, the wider U-shaped segment 1106 in combination with a ground metal 1118 positioned closer to the U-shaped segment 1106 causes the U-shaped segment 1106 to have a sixth characteristic impedance that is less than the first characteristic impedance. As compared to the balun 602 of the configuration shown in FIG. 6, the characteristic impedance of the U-shaped segment 1106 has been decreased by a combination of being wider and by being in closer proximity to the ground metal in such a manner as to restore S-parameter alignment.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive circuitry or negative circuitry may be used in various embodiments in which the present invention is not limited to specific circuitry polarities, device types or voltage or error levels or the like. For example, circuitry states, such as circuitry low and circuitry high may be reversed depending upon whether the pin or signal is implemented in positive or negative circuitry or the like. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A compact planar balun formed on a substrate, comprising:
- a hairpin-shaped conductive microstrip, comprising:
  - first and second linear segments in parallel with each other having a first end forming first and second differential contacts and having a second end, wherein the first and second linear segments have a first characteristic impedance; and
  - a U-shaped segment integrally formed at the second end of the first and second linear segments, wherein the U-shaped segment has a second characteristic impedance that is less than the first characteristic impedance; and
- a single-ended contact conductively coupled at a location along the first linear segment.

2. The compact planar balun of claim 1, wherein the hairpin-shaped conductive microstrip and the single-ended contact form a conductive transmission line converter that converts between single-ended and differential signals having a specified operation frequency.

3. The compact planar balun of claim 1, wherein the second characteristic impedance is selected to achieve scatter parameter alignment.

4. The compact planar balun of claim 1, wherein the hairpin-shaped conductive microstrip is configured to split a single-ended signal having a specified operation frequency received at the single-ended contact into first and second differential signals at the first and second differential contacts having about equal amplitude with a 180-degree phase difference, and wherein the hairpin-shaped conductive microstrip is configured to combine a differential signal having a specified operation frequency received at the first and second differential contacts with a 180-degree phase difference into a single-ended signal at the single-ended contact.

5. The compact planar balun of claim 1, wherein the location along the first linear segment is selected so that an electrical distance along the hairpin-shaped conductive microstrip between the location and first end of the second linear segment is a half wavelength longer than the electrical distance between the location and the first end of the first linear segment for an intended operation frequency.

6. The compact planar balun of claim 1, wherein the first and second linear segments have a uniform width and wherein the U-shaped segment has a width that is greater than the uniform width.

7. The compact planar balun of claim 6, wherein the U-shaped segment is widened in at least one of an orthogonal direction and a longitudinal direction.

8. The compact planar balun of claim 6, further comprising coplanar ground metal provided on the substrate and separated from a periphery of the first and second linear segments by a uniform gap and separated from a periphery of the U-shaped segment by a narrower gap that is smaller than the uniform gap.

9. The compact planar balun of claim 1, wherein the first and second linear segments have a uniform width and wherein the U-shaped segment has the uniform width, further comprising coplanar ground metal provided on the substrate and separated from a periphery of the first and second linear segments by a uniform gap and separated from a periphery of the U-shaped segment by a narrower gap that is smaller than the uniform gap.

10. A packaged integrated circuit, comprising:
- a substrate; and
- a compact planar balun formed by a hairpin-shaped conductive microstrip on the substrate, comprising:
  - first and second linear segments in parallel with each other having a first end forming first and second differential contacts and having a second end, wherein the first and second linear segments have a first characteristic impedance; and
  - a U-shaped segment integrally formed at the second end of the first and second linear segments, wherein the U-shaped segment has a second characteristic impedance that is less than the first characteristic impedance, wherein the second characteristic impedance is selected to achieve scatter parameter alignment; and
- a single-ended contact conductively coupled at a location along the first linear segment.

11. The packaged integrated circuit of claim 10, further comprising:
- an antenna electrically coupled to the single-ended contact; and
- communication circuitry mounted to the substrate and having first and second electrical ports coupled to the first and second differential contacts, respectively, wherein the communication circuitry communicates with an external network via the antenna and the compact planar balun.

12. The packaged integrated circuit of claim 11, wherein the communication circuitry comprises receiver circuitry, wherein the compact planar balun is configured to split a single-ended signal having a specified operation frequency received by the antenna into first and second differential signals at the first and second electrical ports of the receiver circuitry, and wherein the first and second differential signals have about equal amplitude and a 180-degree phase difference.

13. The packaged integrated circuit of claim 11, wherein the communication circuitry comprises transmitter circuitry, and wherein the compact planar balun is configured to combine a differential signal provided by the transmitter circuitry at a specified operation frequency and with a 180-degree phase difference into a single-ended signal for transmission by the antenna.

14. The packaged integrated circuit of claim 11, wherein the communication circuitry comprises transceiver circuitry, and wherein the compact planar balun is configured to split a single-ended signal having a specified operation frequency received by the antenna into first and second differential signals with a 180-degree phase difference at the first and second electrical ports of the transceiver circuitry, and is configured to combine a differential signal provided by the transceiver circuitry at a specified operation frequency and with a 180-degree phase difference into a single-ended signal for transmission by the antenna.

15. The packaged integrated circuit of claim 11, wherein the first and second linear segments have a uniform width and wherein the U-shaped segment has the uniform width, further comprising coplanar ground metal provided on the substrate and separated from a periphery of the first and second linear segments by a uniform gap and separated from a periphery of the U-shaped segment by a narrower gap that is smaller than the uniform gap.

16. The packaged integrated circuit of claim 10, wherein the first and second linear segments have a uniform width and wherein the U-shaped segment has a width that is greater than the uniform width.

17. The packaged integrated circuit of claim 16, wherein the U-shaped segment is widened in at least one of an orthogonal direction and a longitudinal direction.

18. The packaged integrated circuit of claim 16, wherein the U-shaped segment is widened in both an orthogonal direction and a longitudinal direction.

19. The packaged integrated circuit of claim 16, further comprising coplanar ground metal provided on the substrate and separated from a periphery of the first and second linear segments by a uniform gap and separated from a periphery of the U-shaped segment by a narrower gap that is smaller than the uniform gap.

20. The packaged integrated circuit of claim 10, wherein the hairpin-shaped conductive microstrip is configured to split a single-ended signal having a specified operation frequency received at the single-ended contact into first and second differential signals at the first and second differential contacts having about equal amplitude with a 180-degree phase difference, and is configured to combine a differential signal having a specified operation frequency received at the first and second differential contacts with a 180-degree phase difference into a single-ended signal at the single-ended contact.

* * * * *